US008012614B2

(12) United States Patent
Nakashima et al.

(10) Patent No.: US 8,012,614 B2

(45) Date of Patent: Sep. 6, 2011

(54) NON-AQUEOUS ELECTROLYTE BATTERY, AND POWER SUPPLY UNIT

(75) Inventors: Takuya Nakashima, Osaka (JP); Masatoshi Nagayama, Osaka (JP); Yoshiyuki Muraoka, Osaka (JP)

(73) Assignee: Panasonic Corporation, Osaka (JP)

( * ) Notice: Subject to any disclaimer, the term of this patent is extended or adjusted under 35 U.S.C. 154(b) by 787 days.

(21) Appl. No.: 11/653,333

(22) Filed: Jan. 16, 2007

(65) Prior Publication Data

US 2007/0166610 A1 Jul. 19, 2007

(30) Foreign Application Priority Data

Jan. 16, 2006 (JP) ................................ 2006-007362

(51) Int. Cl.
*H01M 16/00* (2006.01)

(52) U.S. Cl. ................................................ 429/3; 429/9

(58) Field of Classification Search .................. 429/3, 9; *H01M 16/00*

See application file for complete search history.

(56) References Cited

U.S. PATENT DOCUMENTS 5,569,553 A * 10/1996 Smesko et al. .................. 429/90
5,683,834 A * 11/1997 Fujimoto et al. .............. 429/221
5,716,731 A * 2/1998 Goetzer et al. ................ 429/103
6,781,343 B1 8/2004 Demachi et al.
2003/0148189 A1 * 8/2003 Yamaki et al. ................ 429/324
2003/0222502 A1 12/2003 Takahashi et al.
2005/0186474 A1 8/2005 Jiang et al.
2006/0251963 A1 * 11/2006 Nakashima et al. .......... 429/144

FOREIGN PATENT DOCUMENTS

CN 1658413 8/2005
JP 8-308103 11/1996
JP 2004-48913 2/2004
JP 2004-56995 2/2004
WO WO 02/25761 A1 3/2002

OTHER PUBLICATIONS

Chinese Office Action, with English Translation, issued in Chinese Patent Application No. 200710001748.3, dated Jul. 5, 2010.

* cited by examiner

*Primary Examiner* — Melvin Mayes
*Assistant Examiner* — Jun Li
(74) *Attorney, Agent, or Firm* — McDermott Will & Emery LLP

(57) ABSTRACT

A non-aqueous electrolyte battery has a positive electrode, a negative electrode, and a non-aqueous electrolyte. The positive electrode has a high-capacity positive electrode portion with a plate area per capacity of smaller than 200 $cm^2$/Ah, and a high-power positive electrode portion with a plate area per capacity of 200 $cm^2$/Ah or larger. The non-aqueous electrolyte battery is advantageous in providing a battery, with use of a single kind of non-aqueous electrolyte battery, which simultaneously satisfies the requirements on high-capacity characteristics capable of performing a long-term continuous discharge, and on high-power characteristics capable of performing a pulse discharge at a large current, without using a hybrid power supply unit which has multiple kinds of batteries and requires a complex control system.

4 Claims, No Drawings

NON-AQUEOUS ELECTROLYTE BATTERY, AND POWER SUPPLY UNIT

BACKGROUND OF THE INVENTION

1. Field of the Invention

The present invention relates to a non-aqueous electrolyte battery for use in the fields of portable devices such as cell-phones and personal computers, power tools such as electric tools and vacuum cleaners, power-driven devices such as electric cars, electric industrial vehicles, electric bikes, electric-assisted bicycles, electric wheelchairs, and electric robots, system power supplies such as load leveling, peak shift, and backup, and others, and more particularly, to improvement in the performance thereof.

2. Description of the Related Art

A power supply unit having high power and high capacity is required in the fields of power tools such as electric tools, and power-driven devices such as electric bikes and electric-assisted bicycles, as compared to the field of portable devices such as cell-phones and personal computers, because fluctuation in the load to a power source is large and a long-term continuous operation is required in the fields of power tools and power-driven devices.

Generally, high-capacity and high-power are incompatible performances in a battery, and it is difficult to simultaneously satisfy both of the performances. For instance, a non-aqueous electrolyte battery such as a lithium ion secondary battery, as an example of high-capacity secondary batteries, is primarily used as a power supply unit in the field of e.g. portable devices, because it allows for a long-term continuous discharge at a low load of about 0.2 C. The non-aqueous electrolyte battery, however, has a current density per electrode area as low as about 0.01 A/cm$^2$ at such a low load operation. Accordingly, the high-capacity non-aqueous electrolyte battery is not suitable as a high-load power supply unit to be used in the field of e.g. power-driven devices such as electric bikes and electric-assisted bicycles, which require discharge with a large current of 0.1 A/cm$^2$ or more in current density. Also, securing pulse discharge characteristics at a large current is important in the field of power-driven devices, because the power source is frequently turned on and off in the field of power-driven devices. It is, however, difficult to obtain a sufficiently large pulse discharge capacity in the high-capacity non-aqueous electrolyte battery, which is generally used in the field of e.g. portable devices. On the other hand, a high-power power supply unit such as a capacitor allows for a discharge at a large current; however, the capacitance thereof is extremely small, which hinders performing a long-term continuous discharge.

As mentioned above, it is difficult to produce a power supply unit that simultaneously satisfies the requirements on both of the characteristics with use of a single kind of battery. In view of the above, a hybrid power supply unit incorporated with a long-term, low-power energy supply unit, and a short-term, high-power power supply unit has been proposed and studied for practical use. For instance, Japanese Unexamined Patent Publication No. Hei 8-308103 (D1), Japanese Unexamined Patent Publication No. 2004-48913 (D2), PCT Unexamined Patent Publication No. WO2002-025761 (D3), and Japanese Unexamined Patent Publication No. 2004-56995 (D4) propose hybrid power supply units, wherein a secondary battery such as a lead battery, a Ni—Cd battery, a nickel metal hydride battery or a lithium ion battery, or a fuel battery is used as a long-term, low-power energy supply unit, and a capacitor (condenser) is used as a short-term, high-power power supply unit.

D1 discloses a hybrid power supply unit provided with a battery, a large-capacitance condenser, and a current controlling circuit. According to the publication, the use efficiency of the battery is improved by the current controlling circuit in such a manner that the battery discharge current to be supplied to the load at a high load current is approximated to the sum of the battery discharge current to be supplied to the load at a low load current and the battery charge current flowing to the condenser. D2 proposes a power supply system for efficiently charging a secondary battery, in which a main battery unit and an auxiliary power supply unit are connected in parallel, and the auxiliary power supply unit and a voltage raising means are connected in series. D3 proposes a hybrid power supply unit provided with a fuel battery and a secondary battery constituted of a multitude of unit secondary cells connected in series, as well as a means for detecting a residual capacity of the unit secondary cells, and a charge controlling means. D4 proposes a hybrid power supply unit including an electric double-layer capacitor provided with a pair of capacitor terminals, an energy storage device, and first and second bidirectional DC/DC converters.

However, the conventional hybrid power supply units as proposed in D1 through D4 employ combination of different kinds of power supply units or different kinds of parts, which requires a complex control system incorporated with a current controlling circuit, a voltage raising means, a residual capacity detecting means, a charge controlling means, and bidirectional DC/DC converters to optimally drive these different kinds of power supply units or the different kinds of parts.

SUMMARY OF THE INVENTION

In view of the above problems residing in the prior art, it is an object of the present invention to provide a battery, with use of a single kind of battery, which enables to simultaneously satisfy the requirements on high-capacity characteristics capable of performing a long-term continuous discharge, and on high-power characteristics capable of performing a pulse discharge at a large current, without using a hybrid power supply unit having multiple kinds of power supplies and accordingly requiring a complex control system.

An aspect of the invention is directed to a non-aqueous electrolyte battery comprising a positive electrode, a negative electrode, and a non-aqueous electrolyte, wherein the positive electrode includes a high-capacity positive electrode portion with a plate area per capacity of smaller than 200 cm$^2$/Ah, and a high-power positive electrode portion with a plate area per capacity of 200 cm$^2$/Ah or larger.

These and other objects, features, aspects, and advantages of the present invention will become more apparent upon reading the following detailed description.

DETAILED DESCRIPTION OF THE EMBODIMENTS

In the following, an embodiment of the invention is described in detail.

A non-aqueous electrolyte battery embodying the invention has a feature that a positive electrode thereof includes a high-capacity positive electrode portion with a plate area per capacity of smaller than 200 cm$^2$/Ah, and a high-power positive electrode portion with a plate area per capacity of 200 cm$^2$/Ah or larger.

A positive electrode widely used for low load application in the field of e.g. portable devices is a high-capacity electrode with a plate area per-capacity of smaller than 200 cm$^2$/Ah.

Such a high-capacity electrode has superior discharge characteristics at a low load of 0.2 C, but has a disadvantage that it may be difficult to obtain a sufficient discharge in use as a power supply unit for a power-driven device such as an electric-assisted bicycle or an electric bike because a discharge at a large current of 5 C or more is required in a start-up operation or on a slope. In a worse case, a discharge may be impossible if the load is further increased. In view of this, the non-aqueous electrolyte battery according to the embodiment of the invention is constructed in such a manner that a high-power positive electrode portion with a plate area per capacity of 200 $cm^2$/Ah or larger is used as a part of the positive electrode to secure a sufficient discharge in a high load condition. With this construction, the high-power positive electrode portion functions as a primary part for performing a discharge at a large current in a large current discharge, and both of the high-capacity positive electrode portion and the high-power positive electrode portion perform a discharge in a small current discharge. Also, a charge from the high-capacity positive electrode portion to the high-power positive electrode portion via a current collector is performed in an electric charge amount that enables to attain potential equilibrium.

A discharge with a large current in the non-aqueous electrolyte battery increases the lithium ion concentration in the vicinity of the negative electrode, and decreases the lithium ion concentration in the vicinity of the positive electrode, which results in non-uniform lithium ion distribution. In particular, in the field of power-driven devices, since the power source is frequently turned on and off, pulse discharge with a large current is performed. In such a condition, the non-uniformity of the lithium ion distribution is increased, which may consequently cause a voltage drop and lower the pulse discharge capacity. The high-power positive electrode portion of the non-aqueous electrolyte battery according to the embodiment of the invention enables to allow for a charge from the high-capacity positive electrode portion to the high-power positive electrode portion when the discharge is suspended, even if a large current discharge occurs resulting in non-uniform lithium ion distribution when the discharge is performed. This enables to positively achieve the uniformity of the lithium ion distribution within the battery, as compared with a conventional battery having merely a single positive electrode with an equipotential structure in which the aforementioned charge is not performed accordingly. With this arrangement, even if a large current pulse discharge is repeatedly performed, the non-aqueous electrolyte battery of the embodiment effectively reduces a voltage drop, and suppresses lowering of the pulse discharge capacity, as compared with the conventional non-aqueous electrolyte battery merely provided with a high-capacity positive electrode or a high-power capacity positive electrode.

The high-power positive electrode portion of the non-aqueous electrolyte battery of the embodiment is required to have a plate area per capacity of 200 $cm^2$/Ah or more to provide a smooth battery reaction by using the larger electrode plate area than that of the high-capacity positive electrode portion. Use of merely a single positive electrode portion with an electrode plate area per capacity of less than 200 $cm^2$/Ah (that is, the high-capacity positive electrode portion) fails to secure a high-rate discharge sufficiently due to an increase in current density per unit area. On the other hand, a larger electrode plate area per capacity lowers the current density per unit area, and accordingly, is suitable for large current application. Considering stable production of electrode plates, however, a preferable electrode plate area per capacity is 800 $cm^2$/Ah or smaller.

In this embodiment, the electrode plate areas per capacity of the high-capacity electrode portion and the high-power electrode portion may be regulated by changing the kind of positive electrode active material, the composition of positive electrode mixture paste, and the like. As a simplified method of regulating the electrode plate area per capacity in using the same kind of positive electrode active material, the ratio of a positive electrode mixture paste versus a current collector in the positive electrode can be adjusted by changing the coating amount of the positive electrode active material. For instance, when lithium cobaltate is used as an exemplified positive electrode active material, a positive electrode portion with a plate area per capacity of less than 200 $cm^2$/Ah can be prepared by setting the amount of the positive electrode active material to be coated on one surface of the electrode plate to 17.8 mg/$cm^2$ or more. Also, a high-power positive electrode portion with a plate area per capacity of not smaller than 200 $cm^2$/Ah and not larger than 800 $cm^2$/Ah can be prepared by setting the amount of the positive electrode active material to be coated on one surface of the electrode plate to the range from 4.4 to 17.7 mg/$cm^2$.

In the embodiment, a difference in electrode plate area per capacity between the high-capacity positive electrode portion and the high-power positive electrode portion can be arbitrarily selected based on the characteristics of a device to which the inventive non-aqueous electrolyte battery is applied. Preferably, however, the difference in electrode plate area per capacity is 100 $cm^2$/Ah or more. Increasing the difference in electrode plate area per capacity between the high-capacity positive electrode portion and the high-power positive electrode portion is preferred, because a non-uniform lithium ion distribution within the battery is positively eliminated.

In the embodiment, any known materials may be used for the positive electrode. Examples of the positive electrode active material include transition metal composite oxides such as lithium cobaltate, lithium nickelate, and lithium manganate. Examples of the binder include polyvinylidene fluoride (PVDF) and polytetrafluoroethylene (PTFE), as well as rubber-based binders such as polyacrylic acid-derived rubber particles (trade name: BM-500B, manufactured by Zeon Corporation). When PTFE or BM-500B is used as the binder, a thickener, such as carboxymethylcellulose (CMC), polyethyleneoxide (PEO), or a modified acrylonitrile rubber (trade name: BM-720H, manufactured by Zeon Corporation), is preferably used in combination. The amounts of the binder and the thickener to be added are not particularly limited, but, it is preferable to add the binder in an amount of 0.1 to 5 parts by mass, and the thickener in an amount of 0.1 to 5 parts by mass, with respect to 100 parts by mass of the positive electrode active material. In the embodiment, a conductive agent and others may also be added as other components. Examples of the conductive agent include acetylene black (AB), Ketjen black, and various graphites. These conductive agents may be used alone or in combination of two or more.

The high-capacity positive electrode portion and the high-power positive electrode portion in the embodiment are respectively prepared by: mixing a positive electrode active material and a binder, in addition to a thickener and a conductive agent as needed, in a solvent such as N-methylpyrrolidone (NMP) to yield a paste; coating the paste, for example, on an aluminum current collector having a thickness of 10 to 50 μm so that the positive electrode active material and the current collector have predetermined thicknesses in each of the positive electrode portions; and drying, rolling, and cutting the resulting composite into pieces.

In the embodiment, any known materials may be used for the negative electrode. Examples of the negative electrode active material include various natural graphites, various artificial graphites, silicon-containing composite materials, and various alloy materials. Examples of the binder include styrene-butadiene copolymers (SBR) and acrylic acid-modified SBR resins. In the embodiment, a thickener of water-soluble polymer may also be used additionally as other component. Examples of the water-soluble polymer include cellulosic resins, and, among them, CMC is preferable. The amounts of the binder and the thickener to be added are not particularly limited, but, it is preferable to add the binder in an amount of 0.1 to 5 parts by mass, and the thickener in an amount of 0.1 to 5 parts by mass, with respect to 100 parts by mass of the negative electrode active material.

In the embodiment, the negative electrode can be prepared by: mixing a negative electrode active material and a binder, in addition to a thickener and a conductive agent as needed, in a solvent such as N-methylpyrrolidone (NMP) to yield a paste; coating the paste, for example, on a copper current collector having a thickness of 10 to 50 μm so that the resulting negative electrode has a predetermined thickness; and drying, rolling, and cutting the resulting composite into pieces. The non-aqueous electrolyte battery according to the embodiment of the invention has a positive electrode with its capacity limited, in other words, the capacity of the negative electrode is greater than that of the positive electrode.

Then, an electrode assembly having a wound or laminated structure is prepared by opposing the positive electrode and the negative electrode thus prepared to each other via a separator. In preparing the electrode assembly, the plate areas of the high-capacity positive electrode portion and the high-power positive electrode portion may not be necessarily identical to each other. The positive electrode may be constructed in such a manner that the plate area of the high-capacity positive electrode portion may be set larger or smaller than that of the high-power positive electrode portion. Further alternatively, the high-capacity positive electrode portion and the high-power positive electrode portion each may be divided into two or more sections, and the plate area per capacity may be different among the divided sections of each positive electrode portion.

In the embodiment, in preparing the electrode assembly of a wound structure, it is preferable to dispose the high-capacity positive electrode portion at an inner position of the electrode assembly than the high-power positive electrode portion. A cycle retention rate of a non-aqueous electrolyte battery tends to decrease, as the maximum discharge current is increased. This is because large Joule heat is generated in the positive electrode in a large current discharge, which may degrade the positive electrode portion at the inner position of the battery. In this embodiment, since the high-power positive electrode portion allows for a large current discharge, heat generation is larger in the high-power positive electrode portion than the high-capacity positive electrode portion. In view of this, the high-power positive electrode portion is disposed at a position of the outer periphery closer to the battery case, which enables to promote release of the Joule heat to the ambient air, thereby suppressing an influence by the heat generation.

The electrode assembly for use in the embodiment is prepared, for instance, by winding a high-capacity positive electrode portion and a negative electrode one over the other with a separator being disposed therebetween, followed by winding a high-power positive electrode portion and a negative electrode one over the other via a separator being disposed therebetween from a winding end portion of the high-capacity positive electrode portion.

The separator for use in the embodiment is preferably a microporous resin film having a melting point of 200° C. or lower. Among such resins, a separator of polyethylene, polypropylene or a mixture or copolymer of polyethylene and polypropylene is more preferable. When the battery is externally short-circuited, such a separator raises the resistance of the battery by fusion, reduces the short-circuiting current, and thereby prevents overheating of the battery by heat generation. The thickness of the separator is preferably in the range of 10 to 40 μm for preservation of desirable ionic conduction and energy density.

The electrode assembly thus prepared is connected to a current collector plate for collection of a current from each of the electrodes. For example, for connection of the electrode assembly to the current collector plate, there may be proposed a method of forming an area exposed to the current collector plate at the terminal of each electrode in the width direction, and contacting the exposed area with the current collector plate at multiple points.

The non-aqueous electrolyte for use in the embodiment is preferably, for example, a solution in which one or more lithium salts such as $LiPF_6$ and $LiBF_4$ is dissolved as a solute in a non-aqueous solvent. Examples of the non-aqueous solvent include ethylene carbonate (EC), propylene carbonate (PC), dimethyl carbonate (DMC), diethyl carbonate (DEC), and methyl ethyl carbonate (MEC). The non-aqueous solvent may be used alone, but combined use of two or more solvents is preferable. In addition, vinylene carbonate (VC), cyclohexylbenzene (CHB), or a derivative of VC or CHB may be added for forming a film on the surface of the active materials in the positive electrode and/or the negative electrode so as to secure, for example, stability during overcharge. The non-aqueous electrolyte for use in the embodiment may be a gel or solid electrolyte in place of the liquid electrolyte.

The non-aqueous electrolyte battery of the embodiment is fabricated by the steps of filling the electrode assembly and non-aqueous electrolyte thus prepared into a battery case and sealing an opening of the battery case.

In the case where the non-aqueous electrolyte battery of the embodiment is used as a power supply unit for various applications, a power supply unit for e.g. high voltage output may be constructed by connecting a number of the non-aqueous electrolyte batteries in series to satisfy the intended output performance.

Although the present invention has been fully described by way of embodiment, the above description is merely an embodiment in all the aspects of the invention, and the present invention is not limited thereby. Therefore, unless otherwise unillustrated changes and modifications depart from the scope of the present invention hereinafter defined, they should be construed as being included therein.

Hereinafter, the present invention will be described more specifically with reference to Examples, but it should be understood that the present invention is not limited by these Examples.

EXAMPLES

Comparative Example 1

30 kg of lithium cobaltate, 10 kg of PVDF #1320 manufactured by Kureha Chemical Industry Co., Ltd. (N-methylpyrrolidone (NMP) solution containing 12 parts by mass in solid matter), 900 g of acetylene black, and a suitable amount of NMP were blended in a double shaft blender to yield a positive electrode paste. The paste was coated on both surfaces of an aluminum foil having a thickness of 15 μm except for widthwise end portions of the aluminum foil for forming an exposed area to be connected to the current collector, so that the active material in the amount of 35.3 mg/cm$^2$ was coated on each surface of the aluminum foil. Thereafter, the aluminum foil coated with the paste was dried and rolled to give a film having a total thickness of 215 μm, and the film was cut into a piece of 56 mm in width and 411 mm in length. Thus, a positive electrode was prepared.

Separately, 20 kg of a synthetic graphite, 750 g of an acrylic acid-modified SBR resin manufactured by Zeon Corporation, BM-400B (trade name, solid matter: 40 parts by mass), 300 g of CMC, and a suitable amount of water were blended in a double shaft blender to yield a negative electrode paste. The paste was coated on both surfaces of a copper foil having a thickness of 10 μm except for widthwise end portions of the copper foil for forming an exposed area, similarly to the preparation of the positive electrode, so that the active material in the amount of 16.0 mg/cm$^2$ was coated on each surface of the copper foil. Thereafter, the copper foil coated with the paste was dried and rolled to give a film having a total thickness of 215 μm, and the film was cut into a piece of 58 mm in width and 471 mm in length. Thus, a negative electrode was prepared.

The positive and negative electrodes were wound with a polyethylene microporous separator (9420G, manufactured by Asahi Kasei Corp.) being interposed therebetween to give a cylindrical electrode assembly. Then, the electrode assembly was placed in a battery case in such a manner that the portion of the aluminum foil carrying no coat of positive electrode paste was exposed to the cap portion of the battery case, and the portion of the copper foil carrying no coat of negative electrode paste was exposed to the bottom portion of the battery case. An aluminum current collector plate (thickness: 0.3 mm) was welded to the aluminum foil area of the positive electrode, and an iron current collector plate (thickness 0.3 mm) was welded to the copper foil area of the negative electrode, respectively. Thereafter, the electrode assembly was placed in a cylindrical battery case of 18 mm in diameter and 68 mm in height. Then, 5 g of a non-aqueous electrolyte containing 1.0M $LiPF_6$ in a mixed solvent of EC and EMC (volume ratio=1:3) was poured into the battery case, and the opening of the battery case was sealed. Thus, a cylindrical lithium-ion secondary cell having an electrode assembly diameter of 95% relative to the inner diameter of the battery case, a theoretical capacity of 2,300 mAh, and a positive-electrode plate area per capacity of 100 cm$^2$/Ah was prepared.

Comparative Example 2

A cylindrical lithium-ion secondary cell having a theoretical capacity of 2,000 mAh and a positive-electrode plate area per capacity of 150 cm$^2$/Ah was prepared in a similar manner as the preparation of the cell in Comparative Example 1, except that, in modifying Comparative Example 1, the positive electrode was prepared to have the active material in an amount of 22.8 mg/cm$^2$ on each surface thereof, a total thickness after rolling of 144 μm, and a length of 536 mm and that the negative electrode was prepared to have the active material in an amount of 17.2 mg/cm$^2$ on each surface thereof, a total thickness of 141 μm, and a length of 596 mm.

Comparative Example 3

A cylindrical lithium-ion secondary cell having a theoretical capacity of 1,800 mAh and a positive-electrode plate area per capacity of 200 cm$^2$/Ah was prepared in a similar manner as the preparation of the cell in Comparative Example 1, except that, in modifying Comparative Example 1, the positive electrode was prepared to have the active material in an amount of 17.7 mg/cm$^2$ on each surface thereof, a total thickness after rolling of 115 μm, and a length of 643 mm and that the negative electrode was prepared to have the active material in an amount of 15.0 mg/cm$^2$ on each surface thereof, a total thickness of 111 μm, and a length of 703 mm.

Comparative Example 4

A cylindrical lithium-ion secondary cell having a theoretical capacity of 1,600 mAh and a positive-electrode plate area per capacity of 300 cm$^2$/Ah was prepared in a similar manner as the preparation of the cell in Comparative Example 1, except that, in modifying Comparative Example 1, the positive electrode was prepared to have the active material in an amount of 11.5 mg/cm$^2$ on each surface thereof, a total thickness after rolling of 80 μm, and a length of 858 mm and that the negative electrode was prepared to have the active material in an amount of 12.1 mg/cm$^2$ on each surface thereof, a total thickness of 75 μm, and a length of 918 mm.

Comparative Example 5

A cylindrical lithium-ion secondary cell having a theoretical capacity of 1,400 mAh and a positive-electrode plate area per capacity of 400 cm$^2$/Ah was prepared in a similar manner as the preparation of the cell in Comparative Example 1, except that, in modifying Comparative Example 1, the positive electrode was prepared to have the active material in an amount of 8.9 mg/cm$^2$ on each surface thereof, a total thickness after rolling of 65 μm, and a length of 1,000 mm and that the negative electrode was prepared to have the active material in an amount of 11.0 mg/cm$^2$ on each surface thereof, a total thickness of 60 μm, and a length of 1,060 mm.

Comparative Example 6

A cylindrical lithium-ion secondary cell having a theoretical capacity of 1,100 mAh and a positive-electrode plate area per capacity of 800 cm$^2$/Ah was prepared in a similar manner as the preparation of the cell in Comparative Example 1, except that, in modifying Comparative Example 1, the positive electrode was prepared to have the active material in an amount of 4.4 mg/cm$^2$ on each surface thereof, a total thickness after rolling of 40 μm, and a length of 1,572 mm and that the negative electrode was prepared to have the active material in an amount of 8.9 mg/cm$^2$ on each surface thereof, a total thickness of 34 μm, and a length of 1,632 mm.

Comparative Example 7

Positive electrodes and negative electrodes in pairs, lengths of which were substantially half as long as the respective corresponding lengths of the electrode pairs obtained in Comparative Examples 4 and 5, were prepared. Then, a cylindrical lithium-ion secondary cell with a theoretical capacity of 1,500 mAh was prepared in a similar manner as the preparation of the cell in Comparative Example 1 except that one of the electrode pairs was wound with a separator being disposed between the electrodes so as to dispose the positive electrode with a plate area per capacity of 300 cm$^2$/Ah at the inner position of the electrode assembly and that the other electrode pairs was wound with a separator disposed therebetween so as to wind the positive electrode with a plate area per capacity of 400 $cm^2$/Ah from a winding end position of the previously wound positive electrode.

Comparative Example 8

An assembled battery was prepared by connecting seven lithium-ion secondary cells obtained in Comparative Example 5 in series.

Example 1

Positive electrodes and negative electrodes in pairs corresponding to those obtained in Comparative Examples 1 and 3 were prepared except that lengths thereof were substantially half as long as the respective corresponding lengths of the positive and negative electrode pairs obtained in Comparative Examples 1 and 3. Then, a cylindrical lithium-ion secondary cell with a theoretical capacity of 2,050 mAh was prepared in a similar manner as the preparation of the cell in Comparative Example 1 except that the lithium-ion secondary cell in Example 1 was prepared by winding one of the positive and negative electrode pairs, with a separator being disposed between the positive and negative electrodes, in such a manner that the positive electrode with a plate area per capacity of 100 $cm^2$/Ah was disposed at the inner position of the electrode assembly, and by winding the other of the positive and negative electrode pairs, with a separator being disposed between the positive and negative electrodes, in such a manner that the positive electrode with a plate area per capacity of 200 $cm^2$/Ah was disposed at the outer position of the electrode assembly by being wound from a winding end position of the previously wound positive electrode.

Example 2

Positive electrodes and negative electrodes in pairs corresponding to those obtained in Comparative Examples 1 and 4 were prepared except that lengths thereof were substantially half as long as the respective corresponding lengths of the positive and negative electrode pairs obtained in Comparative Examples 1 and 4. Then, a cylindrical lithium-ion secondary cell with a theoretical capacity of 1,950 mAh was prepared in a similar manner as the preparation of the cell in Comparative Example 1 except that the lithium-ion secondary cell was prepared by winding one of the positive and negative electrode pairs, with a separator being disposed between the positive and negative electrodes, in such a manner that the positive electrode with a plate area per capacity of 100 $cm^2$/Ah was disposed at the inner position of the electrode assembly, and by winding the other of the positive and negative electrode pairs, with a separator being disposed between the positive and negative electrode, in such a manner that the positive electrode with a plate area per capacity of 300 $cm^2$/Ah was disposed at the outer position of the electrode assembly by being wound from a winding end position of the previously wound positive electrode.

Example 3

Positive electrodes and negative electrodes in pairs corresponding to those obtained in Comparative Examples 1 and 5 were prepared except that lengths thereof were substantially half as long as the respective corresponding lengths of the positive and negative electrode pairs obtained in Comparative Examples 1 and 5. Then, a cylindrical lithium-ion secondary cell with a theoretical capacity of 1,850 mAh was prepared in a similar manner as the preparation of the cell in Comparative Example 1 except that the lithium-ion secondary cell was prepared by winding one of the positive and negative electrode pairs, with a separator being disposed between the positive and negative electrodes, in such a manner that the positive electrode with a plate area per capacity of 100 $cm^2$/Ah was disposed at the inner position of the electrode assembly, and by winding the other of the positive and negative electrode pairs, with a separator being disposed between the positive and negative electrodes, in such a manner that the positive electrode with a plate area per capacity of 400 $cm^2$/Ah was disposed at the outer position of the electrode assembly by being wound from a winding end position of the previously wound positive electrode.

Example 4

Positive electrodes and negative electrodes in pairs corresponding to those obtained in Comparative Examples 1 and 6 were prepared except that lengths thereof were substantially half as long as the respective corresponding lengths of the positive and negative electrode pairs obtained in Comparative Examples 1 and 6. Then, a cylindrical lithium-ion secondary cell with a theoretical capacity of 1,700 mAh, was prepared in a similar manner as the preparation of the cell in Comparative Example 1 except that the lithium-ion secondary cell was prepared by winding one of the positive and negative electrode pairs, with a separator being disposed between the positive and negative electrodes, in such a manner that the positive electrode with a plate area per capacity of 100 $cm^2$/Ah was disposed at the inner position of the electrode assembly, and by winding the other of the positive and negative electrode pairs, with a separator being disposed between the positive and negative electrodes, in such a manner that the positive electrode with a plate area per capacity of 800 $cm^2$/Ah was disposed at the outer position of the electrode assembly by being wound from a winding end position of the previously wound positive electrode.

Example 5

A cylindrical lithium-ion secondary cell with a theoretical capacity of 1,700 mAh was prepared in a similar manner as the preparation of the cell in Example 4 except that the positive electrodes and the negative electrodes were wound in such a manner that the positive electrode with a plate area per capacity of 800 $cm^2$/Ah was disposed at the inner position of the electrode assembly, and that the positive electrode with a plate area per capacity of 100 $cm^2$/Ah was disposed at the outer position of the electrode assembly.

Example 6

Positive electrodes and negative electrodes in pairs corresponding to those obtained in Comparative Examples 2 and 6 were prepared except that lengths thereof were substantially half as long as the respective corresponding lengths of the positive and negative electrode pairs obtained in Comparative Examples 2 and 6. Then, a cylindrical lithium-ion secondary cell with a theoretical capacity of 1,550 mAh was prepared in a similar manner as the preparation of the cell in Comparative Example 1 except that the lithium-ion secondary cell was prepared by winding one of the positive and negative electrode pairs, with a separator being disposed between the positive and negative electrodes, in such a manner that the positive electrode with a plate area per capacity of 150 $cm^2$/Ah was disposed at the inner position of the electrode assembly, and by winding the other of the positive and negative electrode pairs, with a separator being disposed between the positive and negative electrodes, in such a manner that the positive electrode with a plate area per capacity of 800 $cm^2$/Ah was disposed at the outer position of the electrode assembly by being wound from a winding end position of the previously wound positive electrode.

Example 7

A positive electrode and a negative electrode in pair corresponding to those obtained in Comparative Example 1 were prepared except that lengths thereof were substantially two-thirds as long as the respective corresponding lengths of the positive and negative electrode pair obtained in Comparative Example 1. Separately, a positive electrode and a negative electrode in pair corresponding to those obtained in Comparative Example 6 were prepared except that lengths thereof were substantially one-third as long as the respective corresponding lengths of the positive and negative electrode pair obtained in Comparative Example 6. Then, a cylindrical lithium-ion secondary cell with a theoretical capacity of 1,900 mAh was prepared in a similar manner as the preparation of the cell in Comparative Example 1 except that the lithium-ion secondary cell was prepared by winding one of the positive and negative electrode pairs, with a separator being disposed between the positive and negative electrodes, in such a manner that the positive electrode with a plate area per capacity of 100 $cm^2$/Ah was disposed at the inner position of the electrode assembly, and by winding the other of the positive and negative electrode pairs, with a separator being disposed between the positive and negative electrodes, in such a manner that the positive electrode with a plate area per capacity of 800 $cm^2$/Ah was disposed at the outer position of the electrode assembly by being wound from a winding end position of the previously wound positive electrode.

Example 8

A positive electrode and a negative electrode in pair corresponding to those obtained in Comparative Example 1 were prepared except that lengths thereof were substantially one-third as long as the respective corresponding lengths of the positive and negative electrode pair obtained in Comparative Example 1. Separately, a positive electrode and a negative electrode in pair corresponding to those obtained in Comparative Example 6 were prepared except that lengths thereof were substantially two-thirds as long as the respective corresponding lengths of the positive and negative electrode pair in obtained in Comparative Example 6. Then, a cylindrical lithium-ion secondary cell with a theoretical capacity of 1,500 mAh was prepared in a similar manner as the preparation of the cell in Comparative Example 1 except that the lithium-ion secondary cell was prepared by winding one of the positive and negative electrode pairs, with a separator being disposed between the positive and negative electrodes, in such a manner that the positive electrode with a plate area per capacity of 800 $cm^2$/Ah was disposed at the inner position of the electrode assembly, and by winding the other of the positive and negative electrode pairs, with a separator being disposed between the positive and negative electrodes, in such a manner that the positive electrode with a plate area per capacity of 100 $cm^2$/Ah was disposed at the outer position of the electrode assembly by being wound from a winding end position of the previously wound positive electrode.

Example 9

An assembled battery was prepared by connecting seven lithium-ion secondary cells obtained in Example 4 in series.

0.2 C capacity, maximum pulse discharge current, pulse discharge capacity, pulse discharge efficiency (pulse discharge capacity/0.2 C capacity), C rate (maximum pulse discharge current/0.2 C capacity), discharge voltage, and cycle characteristic were measured and assessed with respect to each of the lithium-ion secondary cells thus prepared.

[0.2 C Capacity]

Each of the lithium-ion secondary cells obtained in Examples 1 through 8 and Comparative Examples 1 through 7 was charged to 4.2 V at a current of 1 A and then subjected to a discharge at 0.2 C of a designed theoretical capacity, and the capacity until the cell voltage decreased to 2.5 V was measured. Likewise, each of the assembled batteries obtained in Example 9 and Comparative Example 8 was charged to 29.4 V at a current of 1 A and then subjected to a discharge at 0.2 C of a designed theoretical capacity, and the capacity until the battery voltage decreased to 17.5 V was measured.

[Maximum Pulse Discharge Current]

Each of the lithium-ion secondary cells obtained in Examples 1 through 8 and Comparative Examples 1 through 7 was charged to a voltage of 4.2 V at a current of 1 A, and then subjected to continuous pulse discharge by turning the respective cells on for 0.5 second and turning the respective cells off for 10 seconds repeatedly. In the continuous pulse discharge, the pulse current was increased, and the maximum pulse discharge current allowing retention of a voltage of 3.0 V or more at the start of discharge was measured. Likewise, each of the assembled batteries obtained in Example 9 and Comparative Example 8 was charged to a voltage of 29.4 V at a current of 1 A and then subjected to continuous pulse discharge by turning the respective batteries on for 0.5 second and turning the respective batteries off for 10 seconds repeatedly, and the maximum pulse discharge current allowing retention of a voltage of 21.0 V or more at the start of discharge was measured.

[Pulse Discharge Capacity]

Each of the lithium-ion secondary cells obtained in Examples 1 through 8 and Comparative Examples 1 through 7 was charged to a voltage of 4.2 V at a current of 1 A and then subjected to continuous pulse discharge at the maximum pulse current by turning the respective cells on for 0.5 second and turning the respective cells off for 10 seconds repeatedly, and the capacity until the cell voltage decreased to 2.5 V was measured. Likewise, each of the assembled batteries obtained in Example 9 and Comparative Example 8 was charged to a voltage of 29.4 V at a current of 1 A and then subjected to continuous pulse discharge at the maximum pulse current by turning the respective batteries on for 0.5 second and turning the respective batteries off for 10 seconds repeatedly, and the capacity until the battery voltage decreased to 17.5 V was measured.

[Pulse Discharge Efficiency]

The percentage of the pulse discharge capacity of each lithium-ion secondary cell with respect to its 0.2 C capacity was defined as the pulse discharge efficiency.

[C Rate]

The maximum pulse discharge current of each lithium-ion secondary cell with respect to its 0.2 C capacity was defined as the C rate for assessment.

[Discharge Voltage]

The average discharge voltage of each lithium-ion secondary cell at the maximum pulse discharge current during the continuous pulse discharge was measured.

[Cycle Characteristic Assessment]

Charge of each of the lithium-ion secondary cells obtained in Examples 1 through 8 and Comparative Examples 1 through 7 to a voltage of 4.2 V at a current of 1 A, and continuous pulse discharge at the maximum pulse current until the voltage decreased to 2.5 V were repeated 500 cycles, and the capacity retention rate after the 500 cycles relative to its initial pulse discharge capacity was measured. Likewise, charge of each of the assembled batteries obtained in Example 9 and Comparative Example 8 to a voltage of 29.4 V at a current of 1 A, and continuous pulse discharge at the maximum pulse current until the voltage decreased to 17.5 V were repeated 500 cycles, and the capacity retention rate after the 500 cycles relative to its initial pulse discharge capacity was measured.

The results of the assessments regarding Examples 1 through 9 and Comparative Examples 1 through 8 are shown in Table 1.

ion secondary cell merely provided with the high-capacity positive electrode portion or the high-power positive electrode portion. Comparative Example 7 uses a lithium-ion secondary cell having two kinds of positive electrode portions with plate areas per capacity being different from each other. However, since both of the positive electrode portions are high-power positive electrode portions, a large capacity cannot be secured in a low load condition, and a sufficiently large capacity cannot be obtained even in a high load condition.

Although the lithium-ion secondary cells obtained in Examples 4 and 5 have a positive electrode with a high-capacity positive electrode portion and a high-power positive electrode portion identical to each other between the two lithium-ion secondary cells, the lithium-ion secondary cell in

TABLE 1

| | | power supply type | positive electrode plate (inner position) plate area per capacity ($cm^2/Ah$) | positive electrode plate (outer position) plate area per capacity ($cm^2/Ah$) | 0.2 C capacity (Ah) | maximum pulse discharge current (A) | pulse discharge capacity (Ah) | pulse discharge efficiency [pulse discharge capacity/ 0.2 C capacity] (%) | C rate [maximum pulse charge current/ 0.2 C capacity] (C) | discharge voltage (V) | cycle characteristic (%) |
|---|---|---|---|---|---|---|---|---|---|---|---|
| example | 1 | single cell | 100 | 200 | 2.05 | 15 | 1.91 | 93.2 | 7.3 | 3.35 | 92 |
| | 2 | single cell | 100 | 300 | 1.95 | 21 | 1.83 | 93.8 | 10.8 | 3.36 | 92 |
| | 3 | single cell | 100 | 400 | 1.85 | 27 | 1.74 | 94.1 | 14.6 | 3.37 | 91 |
| | 4 | single cell | 100 | 800 | 1.70 | 49 | 1.62 | 95.3 | 28.8 | 3.40 | 91 |
| | 5 | single cell | 800 | 100 | 1.70 | 49 | 1.62 | 95.3 | 28.8 | 3.40 | 87 |
| | 6 | single cell | 150 | 800 | 1.55 | 51 | 1.48 | 95.5 | 32.9 | 3.40 | 90 |
| | 7 | single cell | 100 | 800 | 1.90 | 27 | 1.82 | 95.8 | 14.2 | 3.39 | 91 |
| | 8 | single cell | 800 | 100 | 1.50 | 64 | 1.43 | 95.3 | 42.7 | 3.41 | 86 |
| | 9 | 7 cells in series | 100 | 800 | 1.70 | 49 | 1.62 | 95.3 | 28.8 | 23.80 | 90 |
| comparative example | 1 | single cell | 100 | | 2.30 | 8.5 | 1.85 | 80.4 | 3.7 | 3.23 | 92 |
| | 2 | single cell | 150 | | 2.00 | 13 | 1.62 | 81.0 | 6.5 | 3.24 | 92 |
| | 3 | single cell | 200 | | 1.80 | 18 | 1.48 | 82.2 | 10.0 | 3.26 | 90 |
| | 4 | single cell | 300 | | 1.60 | 27 | 1.33 | 83.1 | 16.9 | 3.28 | 89 |
| | 5 | single cell | 400 | | 1.40 | 36 | 1.18 | 84.3 | 25.7 | 3.30 | 89 |
| | 6 | single cell | 800 | | 1.10 | 74 | 0.97 | 88.2 | 67.3 | 3.33 | 87 |
| | 7 | single cell | 300 | 400 | 1.50 | 34 | 1.36 | 90.7 | 22.7 | 3.34 | 89 |
| | 8 | 7 cells in series | 400 | | 1.40 | 36 | 1.18 | 84.3 | 25.7 | 23.10 | 88 |

As shown in Table 1, the lithium-ion secondary cells obtained in Examples 1 through 8 can secure a pulse discharge capacity higher than the average of the pulse discharge capacities of the lithium-ion secondary cells obtained in Comparative Examples 1 through 6 each having a single positive electrode corresponding to the high-capacity positive electrode portion or the high-power positive electrode portion of the lithium-ion secondary cells in Examples 1 through 8. This shows that the lithium-ion secondary cells obtained in Examples 1 through 8 have improved high load characteristics. This is because the high-power positive electrode portion allows for a discharge at a large current when the discharge is conducted, and a charge is performed from the high-capacity positive electrode portion to the high-power positive electrode portion when the discharge is suspended, which enables to positively achieve an uniformity of lithium ion distribution within the cell, as compared with a conventional battery which is merely provided with a positive electrode corresponding to either one of the high-capacity positive electrode portion and the high-power positive electrode portion, and is incapable of performing the aforementioned charge from the high-capacity positive electrode portion to the high-power positive electrode portion. With this arrangement, even if a pulse discharge at a large current is repeatedly conducted, the lithium-ion secondary cells obtained in Examples 1 through 8 effectively reduces a voltage drop, and suppresses lowering of the pulse discharge capacity, as compared with the lithium- Example 4, in which the high-power positive electrode portion is disposed at the outer position of the electrode assembly has superior cycle characteristics. This is because the high-power positive electrode portion, which may be overheated due to a large current discharge, is arranged at the outer position in Example 4, thereby promoting cooling, and suppressing degradation.

The assembled battery in Example 9 prepared by connecting a number of the lithium-ion secondary cells obtained in Example 4 in series is advantageous in achieving a high-output voltage without lowering high load characteristics.

As mentioned above, an aspect of the invention is directed to a non-aqueous electrolyte battery comprising a positive electrode, a negative electrode, and a non-aqueous electrolyte, wherein the positive electrode includes a high-capacity positive electrode portion with a plate area per capacity of smaller than 200 $cm^2/Ah$, and a high-power positive electrode portion with a plate area per capacity of 200 $cm^2/Ah$ or larger.

In the above arrangement, the high-capacity positive electrode portion with superior low load characteristics, and the high-power positive electrode portion with superior high load characteristics are built within the single battery, which eliminates the need of incorporating a complex control system. Also, the high-power positive electrode portion functions as a primary part for performing a discharge at a large current in a large current discharge, and a discharge is performed from both of the high-capacity positive electrode portion and the high-power positive electrode portion in a small current discharge. Also, since the high-capacity positive electrode portion and the high-power positive electrode portion are connected to each other as parts of the positive electrode in the battery via a current collector, a charge from the high-capacity positive electrode portion to the high-power positive electrode portion is conducted in an electric charge amount that enables to attain potential equilibrium. This enables to positively achieve lithium ion distribution uniformity within the battery, thereby suppressing a voltage drop at a pulse discharge.

Preferably, the non-aqueous electrolyte battery may have an electrode assembly of a wound structure formed by winding the positive electrode and the negative electrode one over the other, and the high-capacity positive electrode portion may be arranged at an inner position of the electrode assembly than the high-power positive electrode portion.

Joule heat may be generated in the high-power positive electrode portion by a large current discharge. By arranging the high-power positive electrode portion at the outer position of the electrode assembly where heat release is promoted, an influence of the heat is advantageously prevented.

Another aspect of the invention is directed to a power supply unit comprising the non-aqueous electrolyte battery wherein the multiple non-aqueous electrolyte batteries are connected in series.

Since the inventive non-aqueous electrolyte battery provides high-capacity and high-power performances, the power supply unit constructed by connecting a plurality of the non-aqueous electrolyte batteries in series is advantageously used in the field of e.g. power-driven devices where high load characteristics and high energy density are demanded.

This application is based on Japanese Patent Application No. 2006-007362 filed on Jan. 16, 2006, the contents of which are hereby incorporated by reference.

What is claimed is:

1. A non-aqueous electrolyte battery comprising a positive electrode, a negative electrode, and a non-aqueous electrolyte, wherein the positive electrode includes a high-capacity positive electrode portion with a plate area per capacity of smaller than 200 $cm^2$/Ah, and a high-power positive electrode portion with a plate area per capacity of 200 $cm^2$/Ah or larger, wherein:

the high-capacity positive electrode portion contains an amount of a positive electrode active material in a layer on a current collector such that the plate area per capacity is smaller than 200 $cm^2$/Ah, the high-power positive electrode portion contains an amount of a positive electrode active material in a layer on a current collector such that the plate area per capacity is 200 $cm^2$/Ah or larger, and a difference in electrode plate area per capacity between the high-capacity positive electrode portion and the high-power positive electrode portion is 100 $cm^2$/Ah or more, wherein the non-aqueous electrolyte battery has an electrode assembly of a wound structure formed by winding the positive electrode and the negative electrode one over the other, and the high-capacity positive electrode portion is arranged at an inner position of the electrode assembly than the high-power positive electrode portion.

2. A power supply unit comprising the non-aqueous electrolyte battery according to claim 1, wherein the multiple non-aqueous electrolyte batteries are connected in series.

3. The non-aqueous electrolyte battery according to claim 1, wherein the layer in the high-capacity positive electrode portion has a substantially same thickness as the layer in the high-power positive electrode portion.

4. A power supply unit comprising the non-aqueous electrolyte battery according to claim 3, wherein the multiple non-aqueous electrolyte batteries are connected in series.

* * * * *